Oct. 11, 1960
O. T. BENDICSEN
2,955,853
BOLT AND BEARING RETAINERS
Filed April 8, 1957
2 Sheets-Sheet 1
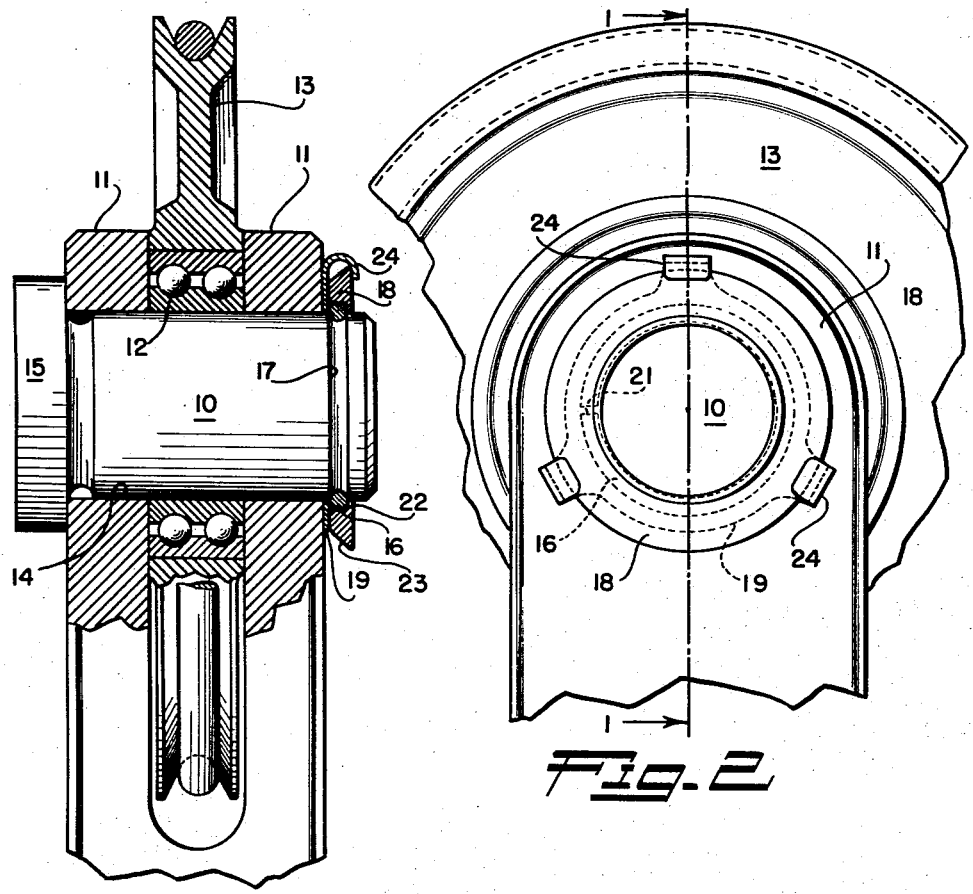
Fig.2
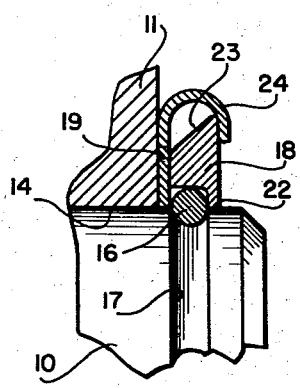
Fig.1
Fig.3
INVENTOR.
OLAF T. BENDICSEN
BY
*George C. Sullivan*
Agent

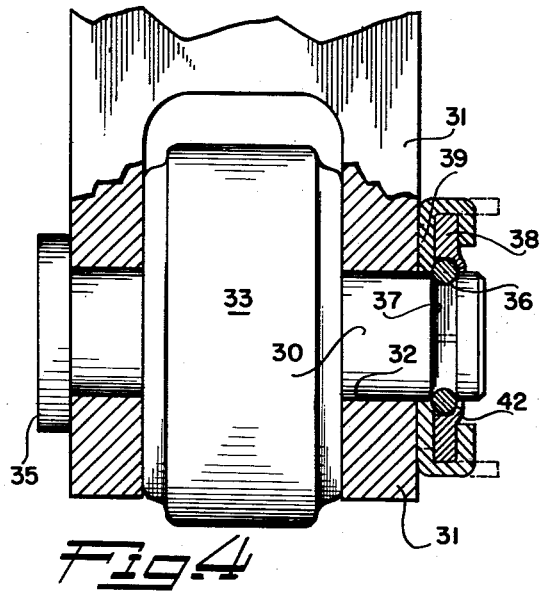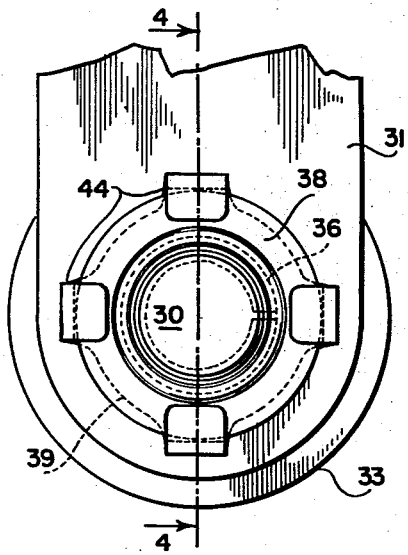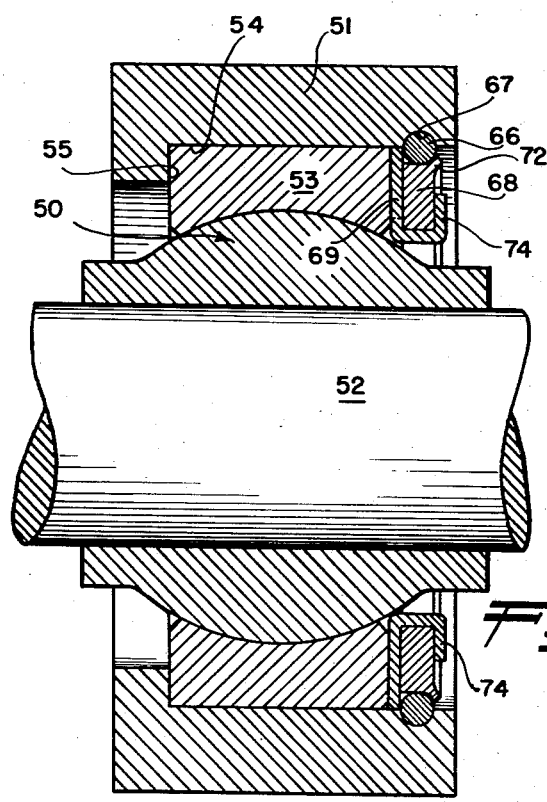

United States Patent Office 2,955,853
Patented Oct. 11, 1960

2,955,853

BOLT AND BEARING RETAINERS

Olaf T. Bendicsen, La Crescenta, Calif., assignor to Lockheed Aircraft Corporation, Burbank, Calif., a corporation of California Filed Apr. 8, 1957, Ser. No. 651,204

3 Claims. (Cl. 287—53)

This invention relates to locking, securing and retaining devices and relates more particularly to retainers for bearings, bolts, shafts, and the like. It is a general object of the invention to provide securing or retaining means for bearings, bolts, shafts, etc. that are inexpensive to manufacture and install, that are compact and light in weight and that are capable of withstanding high magnitude axial loads.

It has been the practice to employ nut, washer and cotter pin combinations as retainers on bolts, shafts, pins, etc. Such three-piece combinations require considerable design space and are rather heavy and accordingly are not well adapted for aircraft applications, and the like, where space and weight factors are critical. Furthermore, the nut, washer and cotter combinations are oftentimes tightened excessively, inducing binding and friction in the joint or connection, causing malfunctioning of the associated mechanism, or may be installed too loosely to allow excessive play or slack which may also produce malfunctioning. Inadvertent excessive tightening of the nut-washer-cotter combinations also oftentimes overstresses the associated attaching lugs which may result in failure of the same. In aircraft applications such failure may of course be the proximate cause of a disater. Split spring rings are also used extensively but are unreliable and become detached when subjected to even moderate axial loading.

Another object of this invention is to provide a three-piece bolt, shaft or bearing retainer that requires considerably less design space in the axial direction than the usual nut, washer and cotter combination (and less axial space than the head of a standard shear type bolt) and is substantially lighter in weight than the latter while being equal or comparable in strength.

Another object of the invention is to provide a retainer means of this kind that cannot be tightened excessively to produce binding or excessive friction and yet cannot be installed to allow excessive looseness or slack in the assembled or connected parts.

Another object of the invention is to provide a retaining means of this character that cannot become unlocked or disengaged as a result of normal usage and yet may be conveniently detached or intentionally removed whenever necessary.

Another object of the invention is to provide a retainer of this kind that is easily and quickly installed. In certain embodiments of the invention the retainer is such that its three pieces or members are locked in the operative positions by merely pressing one of the members in place while in other embodiments one of the three pieces or members has lugs that are readily deformed or bent over to lock the retainer in the operative condition.

A further object of the invention is to provide a retainer of the class described characterized by a novel combination of a split snap ring seated in an external groove in the shaft, rod, or the like, or in an internal groove in a bearing shell, or the like, and a continuous or unsplit lock ring engaged around the snap ring to positively hold the latter in cooperation with the groove. The snap ring engaging in the groove is capable of assuming very heavy axial loads in shear and such axial loading tends to expand or deflect the snap ring radially. However the unsplit lock ring closely engages either the external or internal periphery of the split ring, as the case may be, to absorb this radial load, the hoop tension or compression in the surrounding ring dependably preventing radial deflection of the split ring. The unsplit lock ring also serves to absorb axial loads transmitted through the bolt or shaft or the bearing shell and holds the split ring properly positioned.

Other objectives and features of the invention will become apparent from the following detailed description of the typical preferred forms or embodiments illustrated in the accompanying drawings in which:

Figure 1 is a longitudinal, sectional view of a pulley and shaft assembly incorporating one embodiment of a retainer provided by this invention;

Figure 2 is an enlarged fragmentary face or end elevation of the assembly shown in Fig. 1;

Figure 3 is an enlarged fragmentary sectional view of the retainer and immediately adjacent parts of Figure 1;

Figure 4 is a fragmentary sectional view of another assembly incorporating another form of retainer means of the invention with broken lines illustrating the position of the tabs before being bent into place;

Figure 5 is an end elevation of the assembly shown in Figure 4;

Figure 6 is an enlarged fragmentary sectional view of the retainer of Figure 4; and Figure 7 is a longitudinal sectional view of still another assembly incorporating another form of retainer means of the invention.

The fasteners, locking devices, or retainers of the invention may be employed in various situations and in connection with different types of apparatus and mechanisms. I will proceed with a detailed description of the typical embodiments and typical applications illustrated in the accompanying drawings, it being understood that the invention is not to be construed or restricted to these particular forms or applications.

The retainer of Figures 1, 2 and 3 is shown employed to retain a bolt or shaft 10 in a fork or yoke having two spaced arms 11. The shaft 10 serves to support a bearing 12 positioned between the arms 11 and the bearing in turn rotatably carries a pulley 13. The arms 11 have aligned transverse openings 14 for receiving the shaft 10 and one end of the shaft has a head 15 for engaging against the outer side of one of the arms 11. The locking or retaining device of Figures 1, 2 and 3 comprises, generally, a snap ring or split ring 16 engaging in a groove 17 in the bolt or shaft 10, a lock ring 18 engaging around the split ring 16 and a retainer 19 for holding the lock ring 18 in position on the split ring.

The snap ring or split ring 16 engaged in the groove 17 is in turn engaged and retained by the lock ring 18 to take or absorb axial shaft loads in shear. It is contemplated that the ring 16 will usually be formed of heat treat steel wire or other high strength metal stock and, of course, may be of practically any selected cross sectional shape. For example, the ring 16 may be made of wire or stock of round, square or rectangular transverse cross-section and the groove 17 in the shaft 10 is in turn shaped and proportioned to receive a substantial portion of the ring measured in the radial direction. Thus, as illustrated in Figures 1 and 3, where the snap ring 16 is round or cylindrical in transverse cross-section, the groove 17 has a radial depth equal to approximately one-half the cross sectional diameter of the ring 16 and its walls are rounded and concave to conform to the surface of the ring. This round wire, half-round groove arrangement reduces stress concentrations in the region of the groove thereby allowing higher permissible axial loading of the assembly. The groove 17 is annular and the snap ring 16 is annular or circular and provided with a radial cut or gap 21. The gap 21 permits the ring 16 to be expanded slightly and slid over the end of the shaft 10. When the ring 16 is moved or brought to the groove 17 its resiliency causes the ring to snap into the groove. It will be noted that the groove 17 is located to be spaced a short distance from the face of the contiguous arm 11 when the shaft head 15 is against the outer face of the other arm 11.

The lock ring 18 serves to encircle and engage about the snap ring 16 to lock or hold the same in the groove 17. The ring 18 is preferably generally rectangular in transverse cross-section, having inner and outer sides that are substantially parallel with the outer end or face of the adjacent arm 11. The internal periphery or surface of the ring 18 is preferably cylindrical to be concentric with the periphery of the shaft 10 but is stepped or shaped to have an internal annular rig 22 lying in a plane contiguous to its outer end face. As shown in Figure 3, the internal surface and the lip 22 of the ring 18 cooperate with the protruding surface of the snap ring 16, the lip materially increasing the area of contact with the ring 16. Furthermore, the lip 22 engages with the snap ring 16 to positively prevent movement of the lock ring 18 and retainer 19 axially relative to the shaft 10 and snap ring 16 in a direction toward the lugs or arms 11. In accordance with the invention the lock ring 18 is rigid and preferably continuous or unsplit so as to effectively resist through its hoop tension any tendency for the snap ring 16 to move radially out of the groove 17 when under heavy loads. For reasons which will later become apparent the outer periphery 23 of the lock ring 18 slopes or pitches or is beveled radially outwardly and away from its side closest the structure or arm 11.

The retainer 19 is arranged on the pin or shaft 10 to be between the adjacent face of the arm 11 and the inner side of the lock ring 18 and is shaped or constructed to hold the ring 18 against axial movement or displacement from the split ring 16. As illustrated, the retainer 19 may be a sheet metal or sheet stock member in the form of a ring or annulus and is positioned on the pin or shaft 10 to have its inner broad face bear on the side of the adjacent arm 11 and to have its outer broad face oppose or engage the inner side of the lock ring 18. A plurality of circumferentially spaced lugs or tabs 24 projects from the periphery of the retainer 19. These tabs 24 slope or curve radially and axially outward and then radially inward and axially to have their outer or terminal portions engage against the outer face of the lock ring 18. This is clearly illustrated in Figure 3. In this embodiment of the invention the sloping face 23 of the lock ring 18 and the tabs 24 are constructed and related so that with the snap ring 16 and the retainer 19 in position the lock ring 18 may be slid or moved axially along the shaft 10 to have its sloping face 23 engage with and bend or cam the tabs 24 outwardly and then snap over the ring 18 to bring their terminal regions into engagement with the outer face of the ring 18.

In assembling the structure shown in Figures 1, 2 and 3 the pin or shaft 10 is inserted in the openings 14 and through the bearing 12 and brought to a position where its head 15 engages against the outer face of one arm 11. The retainer 19 is then arranged over the protruding end of the shaft 10 to bear against the outer face of the other arm 11. The snap ring 16 is slid or expanded over the protruding end of the shaft 10 to snap into the groove 17 whereupon the lock ring 18 is started over the projecting end of the shaft 10 and pressed toward the adjacent arm 11 so that its sloping face 23 flexes or spreads the tabs 24 outwardly to ultimately snap over the ring 18, as above described. This locks the ring 18 in the position illustrated where it in turn positively holds the snap ring 16 in the groove 17 and where it, through its hoop tension, prevents radial expansion of the snap ring even under very high axial loading. Further, it will be seen that the lip 22, cooperating with the snap ring 16 and the retainer 19 engaged between the arm 11 and the snap ring 16, hold or secure the retainer device against axial movement relative to the shaft.

If and when it becomes desirable or necessary to remove the shaft 10 the lock ring 18 is engaged at the regions between the tabs 24 and forced outwardly in the axial direction to spring the flexible resilient tabs 24 outwardly away from the lock ring, thus freeing the lock ring and permitting detachment of the entire retainer.

Figures 4, 5 and 6 show another embodiment of the invention associated with a pin or shaft 30 carried by the arms 31 of a fork or yoke. The shaft 30 is engaged in openings 32 in the arms 31. One end of the shaft 30 has a head 35 for engaging against the outer face of one arm 31 and the shaft is sufficiently long to project a short distance beyond the outer face of the other arm 31. In this application of the invention the retainer comprises a snap ring 36, a lock ring 38 and a retainer 39. The rings 36 and 38 and the retainer 39 correspond to the rings 16 and 18 and the retainer 19, respectively, described in detail above. The snap ring 36 may be identical with the ring 16 described above except, possibly, as to dimensions and engages in an annular groove 37 in the protruding end of the shaft 30 which corresponds with the groove 17 above described. In this form of the invention the lock ring 38 is a continuous or unsplit ring of rectangular cross sectional configuration having a cylindrical internal periphery for engaging the periphery of the snap ring 36. The ring 38 has an internal annular lip 42 for engaging with the snap ring 36 to increase the contact area with the latter and to prevent relative axial movement between the rings 36 and 37 in one direction. In this case the lip 42 may be forged or coined or, if desired, machined on the ring 38 and protrudes or curves radially inward and axially outward from both the internal periphery of the ring 36 and the outer face of the ring.

The retainer 39 is substantially the same as the retainer 19 described above. However, the retainer 39 has a curved or concave annular seat 41 formed or provided in its outer surface to bear on or engage with the periphery of the protruding snap ring 36. In accordance with this form of the invention the circumferentially spaced lugs or tabs 44 of the retainer 39 initially project axially from the peripheral region of the retainer so as to permit ready installation of the lock ring 38 within the series of tabs to a position where it engages about the snap ring 36. The broken lines in Figure 6 of the drawings illustrate the configuration of the terminal or outer regions of the lugs 44 as initially formed. When the lock ring 38 has been positioned around the snap ring 36, as above described, the terminal regions of the lugs or tabs 44 are bent inwardly and toward the lock ring 38 to the positions illustrated in full lines in Figures 4, 5 and 6. It will be seen that the retainer 39 provided with the tabs or lugs 44 bent down or distorted in this fashion positively retains the ring 38 in the position where it in turn holds the snap ring 36 in its operative load assuming position in the groove 41.

Figure 7 shows an embodiment of the invention employed to retain a bearing 50 in a structure 51. The bearing 50 serves to support or mount a shaft 52 and the bearing embodies an outer race 53. The race 53 fits within an opening 54 in the structure 51 and its inner end engages against a radial shoulder 55 in the opening. The lock or retainer means of the invention serves to cooperate with the outer end of the bearing race 53 to hold the bearing 50 in the structure 51.

The retaining means of the invention illustrated in Figure 7 comprises a snap ring 66, a lock ring 68 and a retainer 69. These elements correspond in structure and function respectively with the snap ring 36, lock ring 38 and retainer 39 above described except that in this case the retaining means is constructed and arranged to cooperate or lock with the internal configuration of the structure 51 instead of the exterior of a pin or shaft. Thus the snap ring 66 is snapped into an annular internal groove 67 in the wall of the opening 54 and the lock ring 68 is arranged within the snap ring 66 so that the outer periphery of the ring 68 engages with the snap ring and the lip 72 of the lock ring is on its outer peripheral corner to cooperate with the snap ring. The retainer 69 which is arranged between the end of the bearing race and the inner side of the lock ring 68 has circumferentially spaced lugs or tabs 74 projecting axially outward from its internal periphery to engage with the internal periphery of the lock ring 68. The outer or terminal portions of these lugs 74, as initially constructed, are parallel with the axis of the shaft 52, and therefore, with the central axis of the retainer assembly. Assuming that the bearing is in position within the structure 51 so that the race 53 engages against the shoulder 55 the retainer 69 is arranged in the opening 54 to engage against the outer face of the race. The snap ring 66 is then contracted slightly to enter the opening 54 and is allowed to snap or expand into the groove 67. Following this the lock ring 68 is positioned within the snap ring 66 to cooperate with the internal periphery of the snap ring whereupon the outer or terminal regions of the lugs 74 are bent axially inward against the outer face of the lock ring 68 to be conditioned, illustrated in Figure 7. This completes the assembly of the retainer means of the invention. It will be seen that the lock ring 68 positively prevents displacement of the snap ring 66 from the groove 67 even under high axial loading and the retainer 69 together with its lugs 74 in turn prevent displacement of the ring 68. If it becomes necessary or desirable to remove the bearing 50 the terminal regions of the lugs 74 are straightened out or bent to positions where the ring 68 may be slipped out of the snap ring 66 to allow removal of the latter.

The retaining means of the invention are inexpensive to manufacture, easy to install and are light in weight. It will be seen that the retainers may be designed and constructed to be very compact and to occupy a minimum of space in the axial direction and yet be capable of assuming very high axial loads.

Having described only typical forms of the invention I do not wish to be limited to the specific details herein set forth, but wish to reserve to myself any variations or modifications that may appear to those skilled in the art and fall within the scope of the following claims.

I claim:

1. Retaining means for holding a shaft like part against axial displacement from an opening in a part having a face, the shaft like part having an annular groove adjacent said face, the retaining means including a snap ring engaged in the groove and having a peripheral portion projecting therefrom, a rigid lock ring engaging around the projecting portion of snap ring to prevent radial expansion of the snap ring and thus prevent displacement of the snap ring, an annular retainer on the shaft like part engaging against said face and engaged by the projection portion of the snap ring to prevent relative axial movement between the parts in one direction, and spaced lugs projecting axially from the periphery of the retainer and engaging the side of the lock ring most distant from said face to retain the lock ring on the projecting portion of the snap ring, the lugs being flexible and resilient and the periphery of the lock ring being pitched so that upon axial assembly movement of the lock ring onto the snap ring the lugs are flexed outwardly thereby and when the lock ring is on the snap ring the lugs snap back to engage said side of the lock ring.

2. Retaining means for holding a shaft like part against axial displacement from an opening in a part having a face, the shaft like part having an annular groove adjacent said face, the retaining means including a snap ring engaged in the groove and having a peripheral portion projecting therefrom, a rigid lock ring engaging around the projecting portion of the snap ring to prevent radial expansion of the snap ring and thus prevent displacement of the snap ring, the lock ring having an internal lip engaging the region of said projecting portion most distant from said face, a retainer engaged against said face and engageable by the projecting portion of the snap ring to prevent relative axial movement between said parts in one direction, and tabs on the retainer engaging over the lock ring to hold the latter on the projection portion of the snap ring.

3. Retaining means for holding a first part against axial movement in one direction in an opening in a second part, there being an annular groove in the wall of said opening and the first part having an end face adjacent said groove, the retaining means including a split snap ring engaged in said groove and having a portion protruding therefrom, a lock ring engaging within said protruding portion to prevent displacement of the snap ring from the groove, a retainer arranged against said end face and engaged by the protruding portion of the snap ring to hold said parts against relative axial movement in one direction, and lugs on the retainer engaging the side of the lock ring most distant from said end face to prevent displacement of the lock ring from said protruding portion of the snap ring.

References Cited in the file of this patent

UNITED STATES PATENTS

| | | |
|---|---|---|
| 320,392 | Peterson et al. | June 16, 1885 |
| 828,402 | Hart | Aug. 14, 1906 |
| 861,143 | Scott | July 23, 1907 |
| 1,460,538 | Easton | July 3, 1923 |
| 1,844,463 | Dodd | Feb. 9, 1932 |
| 1,895,930 | Junggren | Jan. 31, 1933 |
| 2,322,422 | Danneman | June 22, 1943 |